(12) United States Patent
Tang et al.

(10) Patent No.: US 8,754,617 B2
(45) Date of Patent: Jun. 17, 2014

(54) REVERSE SHUNT REGULATOR

(75) Inventors: Chien-Fu Tang, Hsinchu (TW); Issac Y. Chen, Hsinchu County (TW); Jiun-Hung Pan, Hsinchu County (TW)

(73) Assignee: Richtek Technology Corp., Hsinchu (TW)

( * ) Notice: Subject to any disclaimer, the term of this patent is extended or adjusted under 35 U.S.C. 154(b) by 193 days.

(21) Appl. No.: 13/326,904

(22) Filed: Dec. 15, 2011

(65) Prior Publication Data

US 2012/0155123 A1    Jun. 21, 2012

(30) Foreign Application Priority Data

Dec. 15, 2010    (TW) .............................. 99143948 A (51) Int. Cl.
*G05F 1/613*    (2006.01)
*H02M 3/335*    (2006.01)

(52) U.S. Cl.
USPC ..................... 323/226; 363/21.07; 363/21.15; 323/221; 323/902

(58) Field of Classification Search
CPC ..... H02M 3/145; H02M 3/155; H02M 3/335; G05F 1/613
USPC ................. 323/220, 221, 223, 231, 902, 226; 363/127, 21.07, 21.15
See application file for complete search history.

(56) References Cited

U.S. PATENT DOCUMENTS

| | | | |
|---|---|---|---|
| 6,577,512 B2 * | 6/2003 | Tripathi et al. | 363/21.17 |
| 8,503,196 B2 * | 8/2013 | Tai et al. | 363/21.15 |
| 8,537,574 B2 * | 9/2013 | Isogai et al. | 363/21.12 |
| 2008/0037296 A1 | 2/2008 | Hsu et al. | |
| 2008/0170417 A1 * | 7/2008 | Yang | 363/15 |

* cited by examiner

*Primary Examiner* — Gary L Laxton
(74) *Attorney, Agent, or Firm* — Muncy, Geissler, Olds & Lowe, P.C.

(57) ABSTRACT

A reverse shunt regulator includes a MOSFET connected between a cathode and an anode, a switch and a current source serially connected between the cathode and the anode, and an error amplifier having a positive input node to receive an internal reference voltage, a negative input node connected to the reference electrode, and an output node connected to a control electrode of the MOSFET. When the voltage of the reference electrode is within a range, the larger the voltage of the reference electrode is, the less the current of the MOSFET is. Application of this reverse shunt regulator to a flyback converter for output feedback will reduce the power loss in a green mode of the flyback converter.

9 Claims, 11 Drawing Sheets

REVERSE SHUNT REGULATOR

FIELD OF THE INVENTION

The present invention is related generally to a reverse shunt regulator and, more particularly, to a reverse shunt regulator for green flyback converter control system.

BACKGROUND OF THE INVENTION

Figure 1:
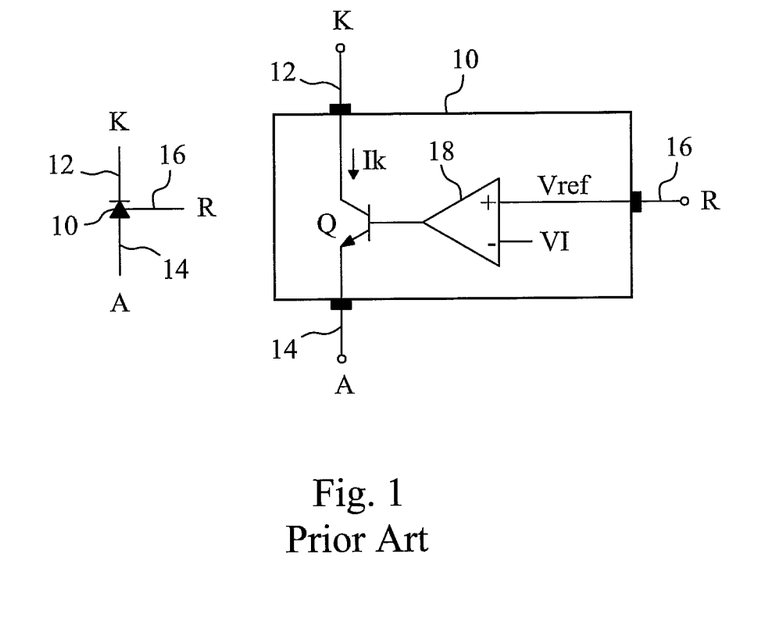
FIG. 1 shows the symbolic circuit and a block diagram of a TL431.
Figure 2:
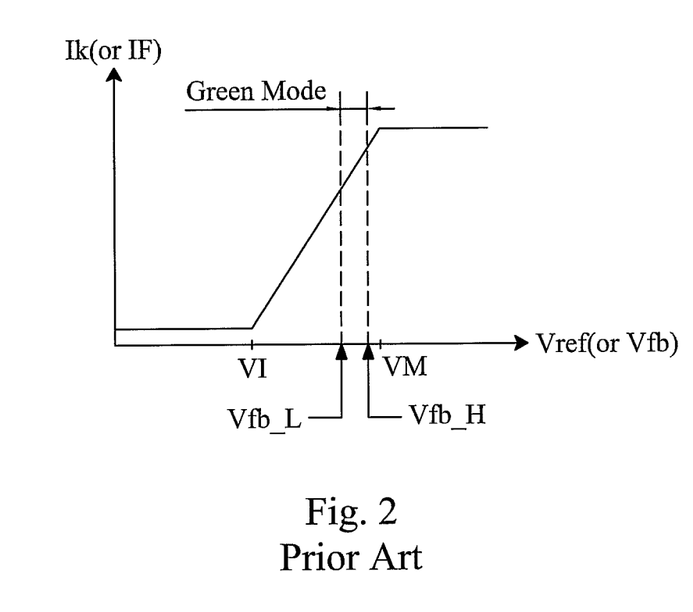
FIG. 2 shows the current-voltage (I-V) characteristic curve of a TL431.

TL431 is a three-terminal shunt regulator chip having popular applications, such as current limit, current source, constant current sink, fixed/adjustable reference generator, constant voltage supply, constant current supply, operational amplifier, boot-strap circuits, low-power bias supply and so on. The symbolic circuit of a TL431 is shown in the left part of FIG. 1, whose right part is shown the internal block diagram thereof, in which a shunt regulator 10 has a cathode 12, an anode 14 and a reference electrode 16, between the cathode 12 and the anode 14 is a bipolar junction transistor (BJT) Q, and an error amplifier 18 determines the base bias of the BJT Q according to the difference between the voltage Vref of the reference electrode 16 and an internal reference voltage VI, to control the current Ik flowing from the cathode 12 to the anode 14. Referring to FIGS. 1 and 2, when the voltage Vref is smaller than the voltage VI, the BJT Q is cut off, and the current Ik is almost zero; when the voltage Vref is larger than the voltage VI, the current Ik increases with the difference between the voltages Vref and VI; and when the voltage Vref is larger than a certain value VM, the current Ik stops increasing, and maintains at a maximum value. It can be known from FIG. 2, when the shunt regulator 10 operates with a relatively large voltage Vref, the current Ik is relatively large, and consequently the power loss is relatively large. Moreover, in some applications, the relatively large current Ik will lead to a relatively large power loss in other circuits.

Figure 3:
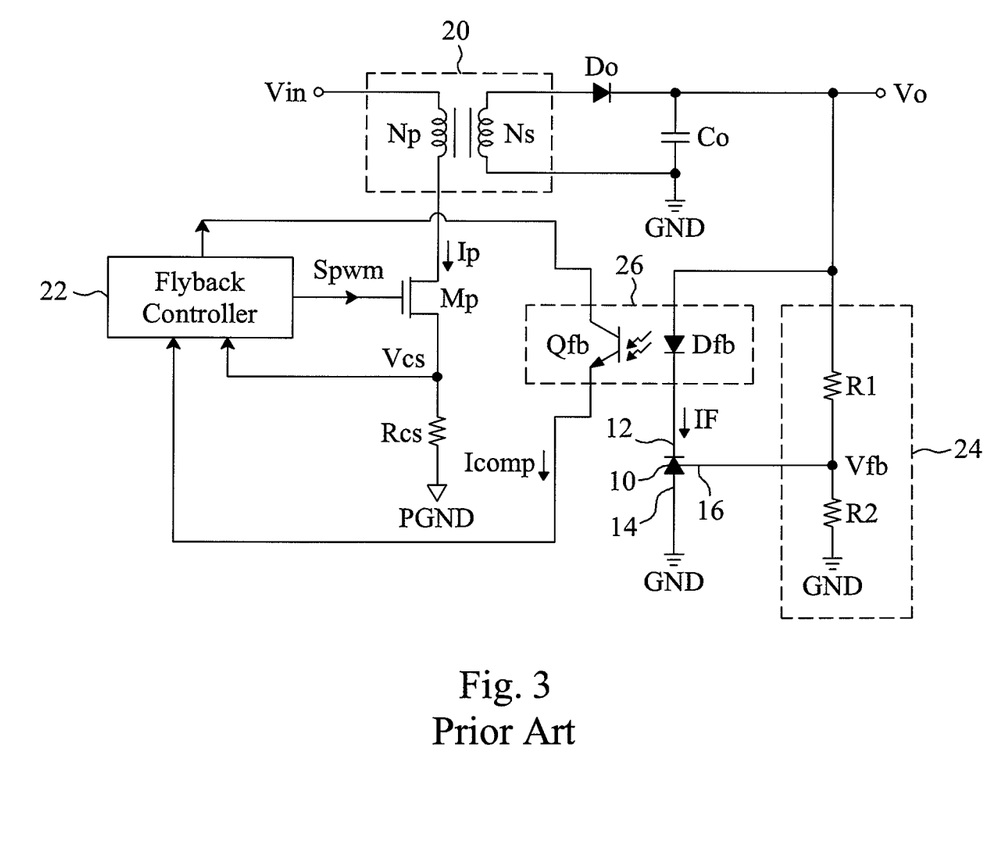
FIG. 3 is a circuit diagram of a conventional flyback converter using a TL431 for output feedback control.
Figure 4:
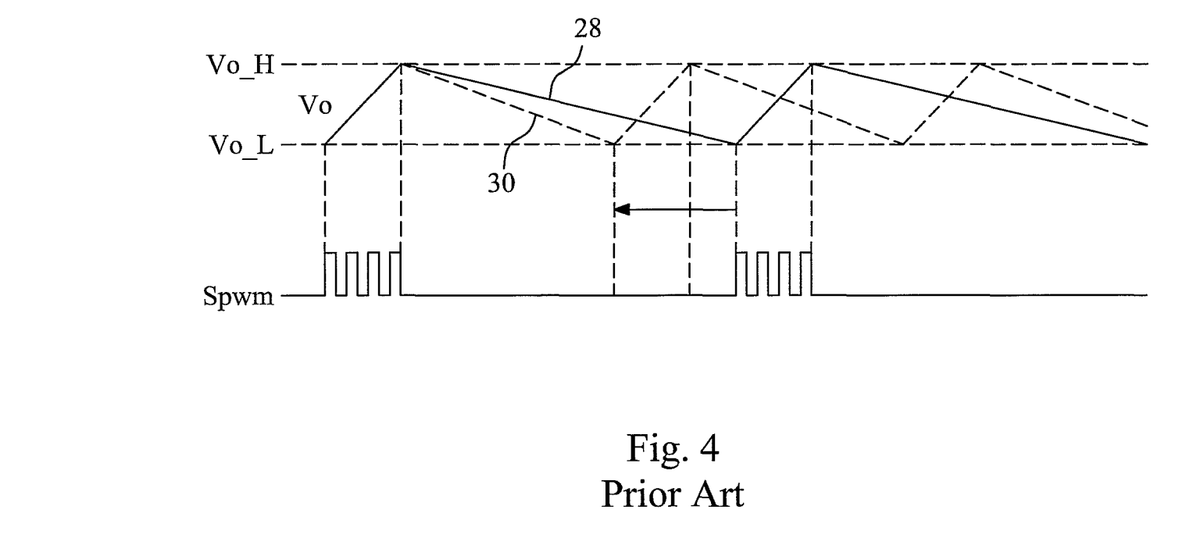
FIG. 4 is a waveform diagram of the flyback converter shown in FIG. 3 operating in a green mode.

Green AC/DC is a trend for earth environment protection especially for no load power loss since un-used adapter may always be hung on without removing. There are some industrial standards to specify the no load power loss, such as EU and CEC. 100 mW is famous now for industrial application, but 50 mW, 30 mW development is on going. The TL431 is frequently adopted in flyback converter control system, as shown in FIG. 3, in which a transformer 20 has its primary coil Np connected between a power input node Vin and a power switch Mp, a flyback controller 22 provides a pulse width modulation (PWM) signal Spwm to switch the power switch Mp, for a secondary coil Ns of the transformer 20 to generate a current to charge a capacitor Co through a diode Do, to thereby generate an output voltage Vo, a voltage divider 24 divides the output voltage Vo to generate a feedback voltage Vfb for the reference electrode 16 of the shunt regulator 10, the shunt regulator 10 and a photocoupler 26 establish an isolated feedback circuit to determine the forward current IF of the photocoupler 26 according to the feedback voltage Vfb, to thereby control a feedback current Icomp, and the flyback controller 22 modulates the duty cycle of the PWM signal Spwm according to the voltage Vcs of a current sense resistor Rcs and the feedback current Icomp, to control the power delivery of the transformer 20 from the primary side to the secondary side, to thereby regulate the output voltage Vo. As shown in this flyback converter, the TL431 scheme consumes much power, even at no load of the flyback converter. U.S. Patent Application Publication No. 2008/0037296 discloses a green-mode flyback PWM apparatus to reduce the switching frequency of the power switch MP for light load in order to reduce the power loss of a converter. When the flyback converter operates in the green mode, referring to FIGS. 3 and 4, whenever the output voltage Vo drops to a threshold Vo_L, the PWM signal Spwm is provided to switch the power switch Mp to increase the output voltage Vo; whenever the output voltage Vo increases to a threshold Vo_H, the flyback controller 22 stops providing the PWM signal Spwm and thus the output voltage Vo decreases gradually until it reaches the threshold Vo_L again. Since the power switch Mp is not switched during the period where the output voltage Vo drops from Vo_H to Vo_L, the power loss is reduced. However, in the green mode, referring to FIGS. 2-4, the feedback voltage Vfb varies between Vfb_L and Vfb_H, and thus the shunt regulator 10 draws a relatively large current IF from the power output node Vo, causing the output voltage Vo to decrease faster, thereby resulting in more times of switching of the power switch Mp. For example, as shown by the waveforms 28 and 30 of FIG. 4, the larger the current IF is, the faster the output voltage Vo decreases, and thus the faster the Vo_L is reached, causing earlier recovery of the PWM signal Spwm to switch the power switch Mp. In other words, the period where the power switch Mp becomes silent is shortened, and the switching times increase.

SUMMARY OF THE INVENTION

An objective of the present invention is to provide a power saving reverse shunt regulator.

Another objective of the present invention is to provide a less light load and no load power loss flyback converter.

A further objective of the present invention is to provide a control method to reduce the light load and no load power loss of a flyback converter.

According to the present invention, a reverse shunt regulator includes a cathode, an anode, a reference electrode, a MOSFET connected between the cathode and the anode, and an error amplifier having a positive input node to receive an internal reference voltage, a negative input node connected to the reference electrode, and an output node connected to a control electrode of the MOSFET. This reverse shunt regulator is so configured that when the voltage of the reference electrode is within a certain range, the larger the voltage of the reference electrode is, the smaller the current of the MOSFET is.

According to the present invention, a flyback converter includes a flyback controller to control the power delivery of a transformer from a primary side to a secondary side, and a photocoupler to provide a feedback current derived from the power output node to the flyback controller, a reverse shunt regulator to control the feedback current according to the output voltage of the power output node. When the output voltage is within a certain range, the larger the output voltage is, the smaller the feedback current is.

According to the present invention, a control method for output feedback of a flyback converter includes drawing a current from the power output node of the flyback converter to generate a feedback current, adjusting the feedback current according to the output voltage of the flyback converter, and controlling the feedback current such that when the output voltage is within a certain range, the greater the output voltage is, the smaller the feedback current is.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 5:
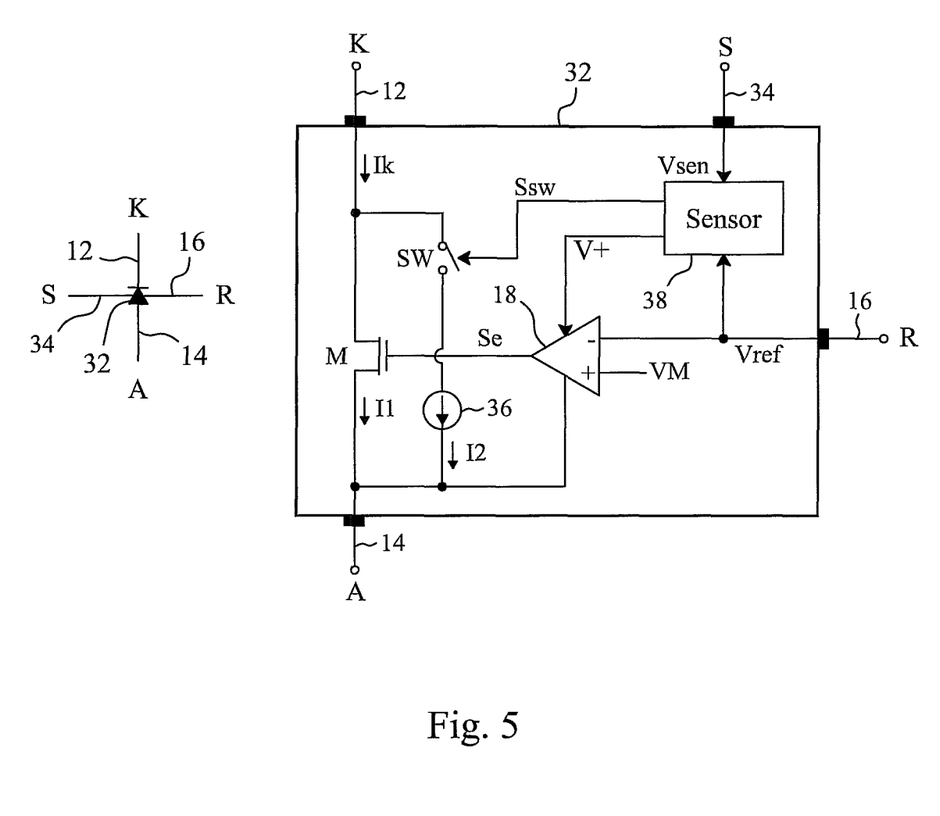
FIG. 5 is a circuit diagram of a first embodiment of a reverse shunt regulator according to the present invention.
Figure 6:
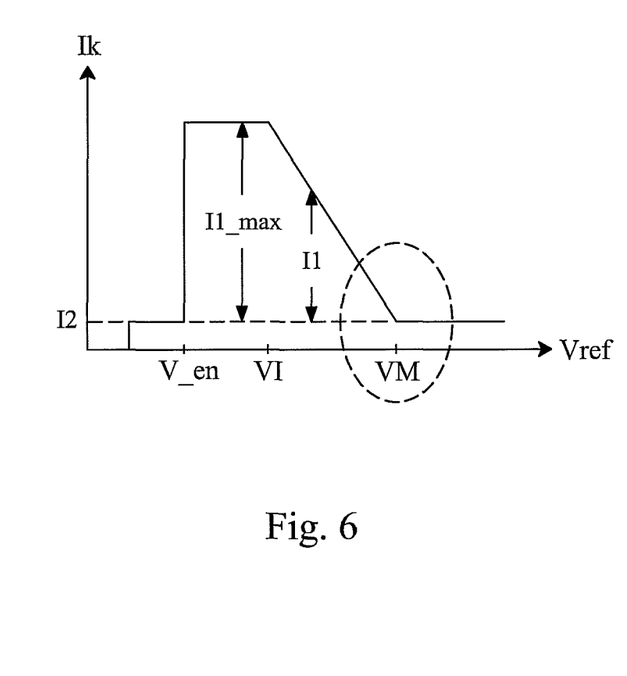
FIG. 6 shows the I-V characteristic curve of the reverse shunt regulator shown in FIG. 5.

As shown by the first embodiment of FIG. 5, in addition to the cathode 12, the anode 14 and the reference electrode 16, a reverse shunt regulator 32 according to the present invention further includes a sense electrode 34. In the reverse shunt regulator 32, a MOSFET M is connected between the cathode 12 and the anode 14, an error amplifier 18 has a positive input node to receive an internal reference voltage VM, a negative input node connected to the reference electrode 16, and an output node connected to a control electrode of the MOSFET M, a switch SW and a current source 36 are serially connected between the cathode 12 and the anode 14, and a sensor 38 has two input nodes connected to the sense electrode 34 and the reference electrode 16, respectively, and two output nodes connected to a control node of the switch SW and a positive bias input node V+ of the error amplifier 18. Different from the error amplifier 18 shown in FIG. 1, the reverse shunt regulator 32 of FIG. 5 has its reference electrode 16 connected to the negative input node of the error amplifier 18, and therefore, as shown in FIG. 6, its current-voltage (I-V) characteristic curve is a reverse of the I-V characteristic curve shown in FIG. 2. Referring to FIGS. 5 and 6, assuming that the switch SW is closed circuit, when the voltage Vref is larger than the voltage VM, the error amplifier 18 will not turn on the MOSFET M, and thus the current Ik=I2; when the voltage Vref is smaller than the voltage VM, the MOSFET M will be turned on, and thus the current Ik=I1+I2; and when the voltage Vref is smaller than a certain voltage VI, the output Se of the error amplifier 18 will be strong enough to control the MOSFET M in full on, so the current Ik is the maximum=I1_max+I2. As shown in FIG. 6, when the reverse shunt regulator 32 operates with a relatively large voltage Vref, the current Ik is relatively small, and thus the power loss is small. Returning back to FIG. 5, the sensor 38 determines a control signal Ssw for the switch SW according to the voltage Vsen of the sense electrode 34, and a positive bias V+ for the error amplifier 18 according to the voltage Vref of the reference electrode 16. In particular, the sensor 38 controls to enable the current source 36 and the error amplifier 18. For instance, as shown in FIG. 6, when the voltage Vsen is larger than a certain value, the switch SW is turned on, so Ik=I2; when the voltage Vref is larger than V_en, the error amplifier 18 is enabled, so Ik=I2+I1. Alternatively, in some embodiments, the reverse shunt regulator 32 may be designed to determine the control signal Ssw according to the voltage Vref, and the positive bias V+ according to the voltage Vsen.

Figure 7:
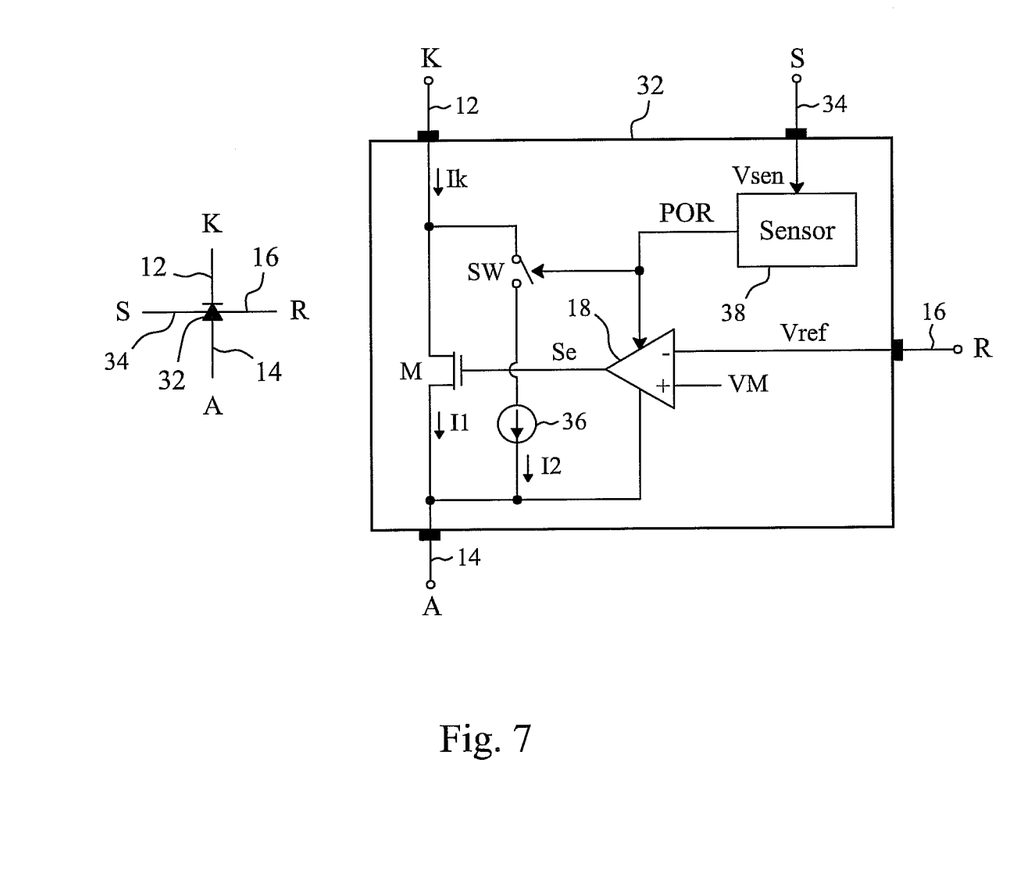
FIG. 7 is a circuit diagram of a second embodiment of a reverse shunt regulator according to the present invention.
Figure 8:
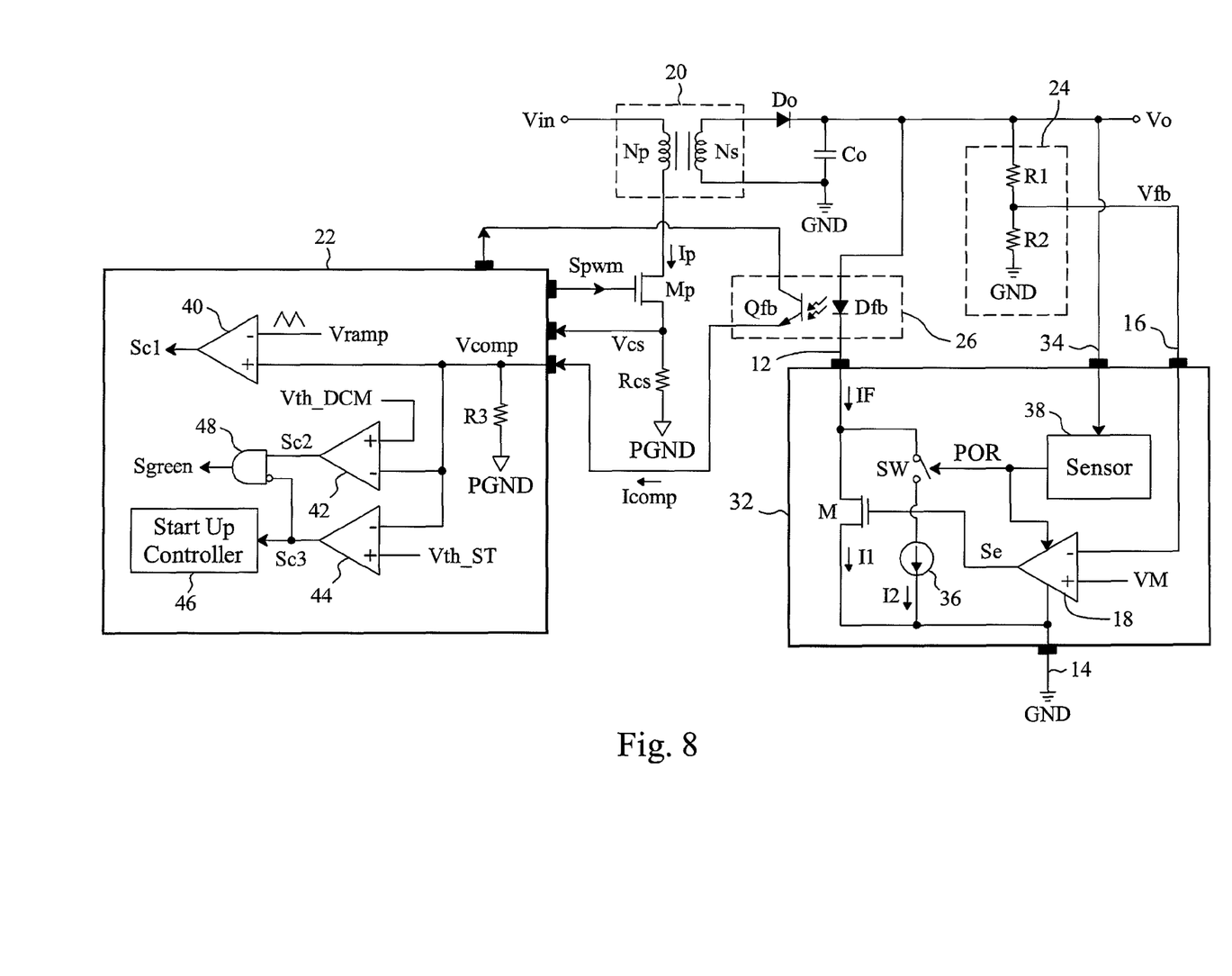
FIG. 8 is a circuit diagram of a flyback converter using the reverse shunt regulator shown in FIG. 7.
Figure 9:
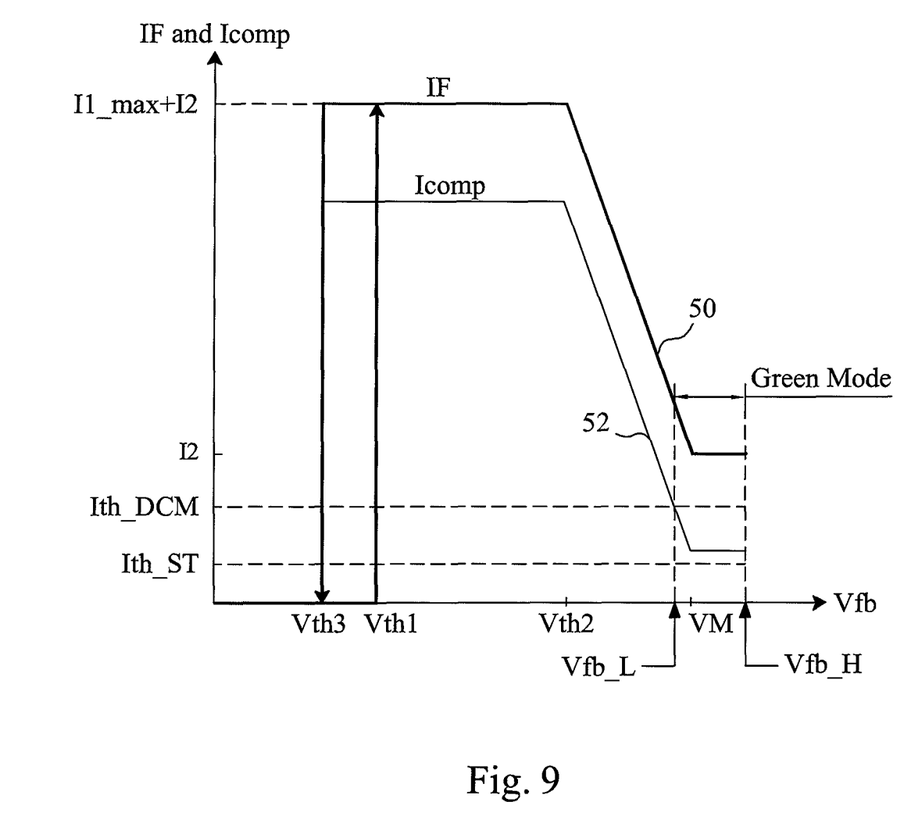
FIG. 9 is a diagram showing the operation of the flyback converter of FIG. 8.

FIG. 7 is a circuit diagram of a second embodiment of the reverse shunt regulator 32, in which the sensor 38 provides a voltage signal POR to the control node of the switch SW and the positive-bias input node of the error amplifier 18 according to the voltage Vsen. FIG. 8 is a circuit diagram of a flyback converter using the reverse shunt regulator 32 of FIG. 7, in which a flyback controller 22 includes a resistor R3 to receive the feedback current Icomp to generate a feedback voltage Vcomp, a comparator 40 to compare the feedback voltage Vcomp with a ramp voltage Vramp to generate a control signal Sc1, a comparator 42 to compare the feedback voltage Vcomp with a threshold voltage Vth_DCM to generate a control signal Sc2, a comparator 44 to compare the feedback voltage Vcomp with a threshold voltage Vth_ST to generate a control signal Sc3 for a start up controller 46, and an AND gate 48 to determine a green-mode signal Sgreen according to the control signal Sc2 and the inverse of the control signal Sc3, and the reverse shunt regulator 32 has its cathode 12 connected to a LED Dfb of the photocoupler 26, its anode 14 grounded, its reference electrode 16 connected to the voltage divider 24 to receive the feedback voltage Vfb, and its sense electrode 34 connected to the power output node Vo. The characteristic curves of the forward currents IF and the feedback current Icomp to the feedback voltage Vfb are shown by curves 50 and 52 of FIG. 9, respectively. Referring to FIGS. 8 and 9, at the time that the flyback converter starts up, the output voltage Vo=0, so the power on reset signal POR is low, and in turn the switch SW is open circuit, the error amplifier 18 is disabled, and the currents IF and Icomp are zero. In this case, due to the feedback current Icomp lower than the threshold Ith_ST, the feedback voltage Vcomp is smaller than Vth_ST, so the control signal Sc3 is high, and thus the start up controller 46 controls the flyback controller 22 to enter its start-up mode, to force the power switch Mp to switch in order to increase the output voltage Vo. When the output voltage Vo increases to a preset threshold, so that the feedback voltage Vfb increases to a threshold Vth1 as shown in FIG. 9, the sensor 38 of the reverse shunt regulator 32 triggers the power on reset signal POR to turn off the switch SW and enable the error amplifier 18. At this time, the feedback voltage Vfb is smaller, and thus the difference between it and the reference voltage VM is larger. As a result, the output signal Se of the error amplifier 18 makes the MOSFET M in full on, so the current I1 is the maximum I1_max, and the current IF jumps to its maximum immediately, making the feedback current Icomp larger than the threshold Ith_ST. Thus, the feedback voltage Vcomp becomes larger than Vth_ST, and the control signal Sc3 turns to low, so the start up controller 46 disables and the flyback controller 22 enters its normal mode where it switches the power switch Mp according to the voltages Vcs and Vcomp. As the output voltage Vo keeps increasing, the MOSFET M remains in full on, so the currents IF and Icomp remain constant until the feedback voltage Vfb reaches a threshold Vth2, after which the current I1 decreases as the difference between Vfb and VM decreases. When the feedback voltage Vfb increases to VM, the MOSFET M becomes in full off, and thus IF=I2, and the feedback current Icomp remains at a constant. After the power on reset signal POR is triggered, only when the output voltage Vo decreases to the extent that the feedback voltage Vfb is smaller than the threshold Vth3, the power on reset signal POR can be turned off. At light load or no load of the flyback converter, when the output voltage Vo increases, the feedback voltage Vfb increases, and thus the forward current IF decreases, and the feedback current Icomp decreases, too; when the feedback current Icomp decreases to the threshold Ith_DCM, the feedback voltage Vcomp decreases to Vth_DCM, causing the control signal Sc2 turning to high level to trigger the green-mode signal Sgreen, which controls the flyback controller 22 to enter the green mode. In the green mode, the feedback voltage Vfb swings between Vfb_L and Vfb_H, and so the feedback current Icomp varies between Ith_DCM and Ith_ST, and the reverse shunt regulator 32 consumes a relatively small current IF, which makes the output voltage Vo to drop very slowly, and the period where the power switch Mp keeps silent is prolonged, leading to less power loss. In other embodiments, the sense electrode 34 of the reverse shunt regulator 32 may be connected to another power supply node or supplied with a signal indicative of power on, for triggering the power on reset signal POR.

Figure 10:
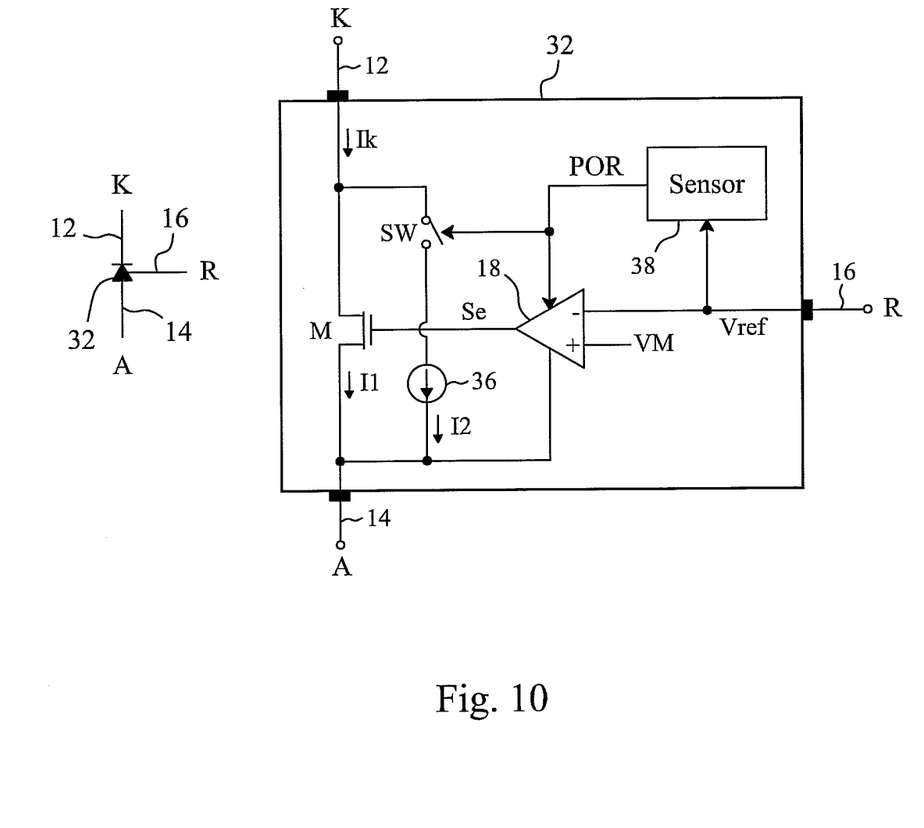
FIG. 10 is a circuit diagram of a third embodiment of a reverse shunt regulator according to the present invention.

FIG. 10 is a circuit diagram of a third embodiment according to the present invention, in which the sensor 38 senses the voltage Vref of the reference electrode 16 to trigger the power on reset signal POR, and thus the reverse shunt regulator 32 needs not the sense electrode illustrated in the foresaid embodiments.

Figure 11:
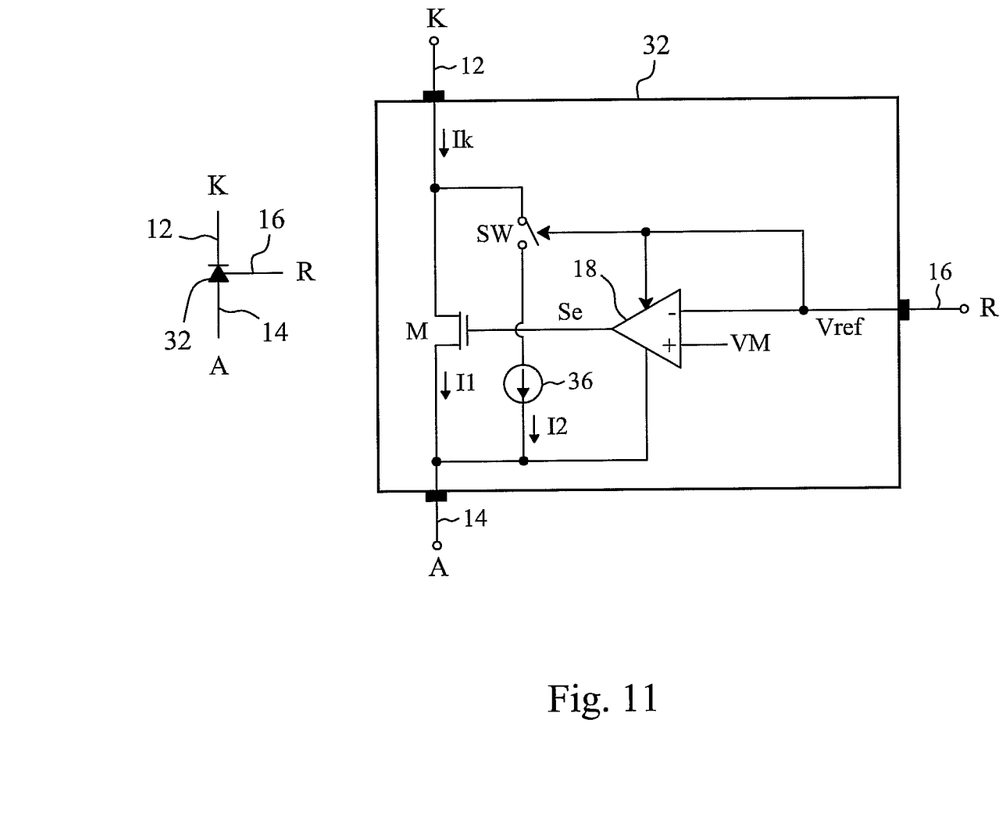
FIG. 11 is a circuit diagram of a fourth embodiment of a reverse shunt regulator according to the present invention.

FIG. 11 is a circuit diagram of a fourth embodiment according to the present invention, in which the reverse shunt regulator 32 does not use the sensor and the sense electrode illustrated in the foresaid embodiments, but supplies the voltage Vref directly to the control node of the switch SW and the positive-bias input node of the error amplifier 18, in order to enable/disable the error amplifier 18 and the current source 36 simultaneously.

As illustrated by the embodiments shown in FIGS. 5, 7, 10 and 11, the reverse shunt regulator 32 according to the present invention has an I-V (Ik to Vref) characteristic curve that is a reverse of that of a TL431, and in the range between VI and VM, the larger the voltage Vref is, the smaller the current Ik is. Furthermore, when Vref≧VM, Ik=I2, only a small current is consumed. When applied to a flyback converter, the reverse shunt regulator 32 facilitates minimizing the power loss in the green mode.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A reverse shunt regulator comprising:
   a cathode;
   an anode;
   a reference electrode;
   a MOSFET connected between the cathode and the anode;
   an error amplifier having a positive input node to receive an internal reference voltage, a negative input node connected to the reference electrode, and an output node connected to a control electrode of the MOSFET; and
   a sensor connected to the reference electrode and the error amplifier, operative to provide a positive bias to the error amplifier according to a voltage of the reference electrode.

2. The reverse shunt regulator of claim 1, further comprising:
   a sense electrode connected to the sensor; and
   a switch and a current source connected in series between the cathode and the anode;
   wherein the sensor controls the switch according to a voltage of the sense electrode.

3. The reverse shunt regulator of claim 1, further comprising a switch and a current source connected in series between the cathode and the anode, wherein the sensor controls the switch according to the voltage of the reference electrode.

4. A reverse shunt regulator comprising:
   a cathode;
   an anode;
   a reference electrode;
   a sense electrode;
   a MOSFET connected between the cathode and the anode;
   an error amplifier having a positive input node to receive an internal reference voltage, a negative input node connected to the reference electrode, and an output node connected to a control electrode of the MOSFET; and
   a sensor connected to the sense electrode and the error amplifier, operative to provide a positive bias to the error amplifier according to a voltage of the sense electrode.

5. The reverse shunt regulator of claim 4, further comprising a switch and a current source connected in series between the cathode and the anode, wherein the sensor controls the switch according to the voltage of the sense electrode.

6. A reverse shunt regulator comprising:
   a cathode;
   an anode;
   a reference electrode;
   a MOSFET connected between the cathode and the anode; and
   an error amplifier having a positive input node to receive an internal reference voltage, a negative input node connected to the reference electrode, an output node connected to a control electrode of the MOSFET, and a positive-bias input node connected to the reference electrode.

7. The reverse shunt regulator of claim 6, further comprising a switch and a current source connected in series between the cathode and the anode, wherein the switch has a control node connected to the reference electrode.

8. A flyback converter comprising:
   a transformer;
   a power output node at a secondary side of the transformer, providing an output voltage;
   a reverse shunt regulator connected to the photocoupler, controlling the feedback current according to the output voltage, wherein for the output voltage within a range, the larger the output voltage is, the smaller the feedback current is;
   wherein the reverse shunt regulator comprises a MOSFET connected to the photocoupler, controlled to establish a current, wherein responsive to the output voltage within the range, the larger the output voltage is, the smaller the current of the MOSFET is.

9. The flyback converter of claim 8, wherein the reverse shunt regulator further comprises a current source connected to the photocoupler, determining a minimum value of the feedback current for the output voltage within the range.

\* \* \* \* \*